US009597991B2

(12) United States Patent
Amick

(10) Patent No.: US 9,597,991 B2
(45) Date of Patent: Mar. 21, 2017

(54) EMERGING BAY DOOR CUPHOLDER

(71) Applicant: GM GLOBAL TECHNOLOGY OPERATIONS LLC, Detroit, MI (US)

(72) Inventor: Douglas J. Amick, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/820,737

(22) Filed: Aug. 7, 2015

(65) Prior Publication Data
US 2017/0036584 A1 Feb. 9, 2017

(51) Int. Cl.
*B60N 3/10* (2006.01)
*B65D 43/16* (2006.01)

(52) U.S. Cl.
CPC ............ *B60N 3/102* (2013.01); *B65D 43/16* (2013.01)

(58) Field of Classification Search
CPC .......... B60N 3/102; B60N 3/10; B65D 43/16; B65D 43/20; B60R 7/04; B60R 7/06
USPC ....... 220/737, 826, 825, 827, 812, 811, 810, 220/264, 263, 326, 758, 817, 818; 224/542, 539; 296/37.12, 24.34, 37.8; 248/311.2, 312, 312.1
See application file for complete search history.

(56) References Cited

U.S. PATENT DOCUMENTS

| 5,065,884 A * | 11/1991 | Naritomi | B65D 43/26 220/264 |
| 5,280,848 A * | 1/1994 | Moore | B60N 3/102 220/264 |
| 5,620,122 A * | 4/1997 | Tanaka | B60N 3/102 220/264 |
| 6,065,729 A * | 5/2000 | Anderson | B60N 3/102 224/282 |
| 6,409,136 B1 * | 6/2002 | Weiss | B60N 3/102 224/926 |
| 6,662,405 B2 * | 12/2003 | Vitry | B60R 7/06 16/277 |
| 7,063,225 B2 * | 6/2006 | Fukuo | B60R 7/04 16/354 |
| 7,527,166 B2 * | 5/2009 | Kondo | B60R 11/00 220/825 |
| 7,571,885 B2 * | 8/2009 | Katagiri | B60N 3/101 224/483 |
| 7,621,419 B2 * | 11/2009 | Fukuo | B60R 7/06 16/354 |
| 7,766,407 B2 * | 8/2010 | Nakaya | B60N 3/08 292/334 |

(Continued)

FOREIGN PATENT DOCUMENTS

JP 02109754 A * 4/1990 ............ B60R 7/06

*Primary Examiner* — Robert J Hicks
(74) *Attorney, Agent, or Firm* — Quinn Law Group

(57) ABSTRACT

A cupholder assembly includes an outer housing and an inner carriage movably disposed within the outer housing. The inner carriage defines at least one cup well. A first door and a second door are movable between closed positions, which block the inner carriage, and open positions, which allow access to the inner carriage. A biasing member is configured to one of: bias the inner carriage away from the outer housing, and rotate one of the first door and the second door. Opening one of the first door and the second door releases the biasing member and allows at least a portion of the inner carriage to move upward relative to the outer housing.

8 Claims, 5 Drawing Sheets

(56) References Cited

U.S. PATENT DOCUMENTS

| | | | |
|---|---|---|---|
| 8,794,473 B2* | 8/2014 | Kang | B60R 7/04 220/326 |
| 2005/0023280 A1* | 2/2005 | Kondo | B60R 11/00 220/263 |
| 2006/0037984 A1* | 2/2006 | Misumi | B60N 3/107 224/282 |
| 2009/0095764 A1* | 4/2009 | Schaal | B60N 3/101 220/737 |
| 2012/0104011 A1* | 5/2012 | Tsunoda | B60N 3/106 220/810 |

* cited by examiner

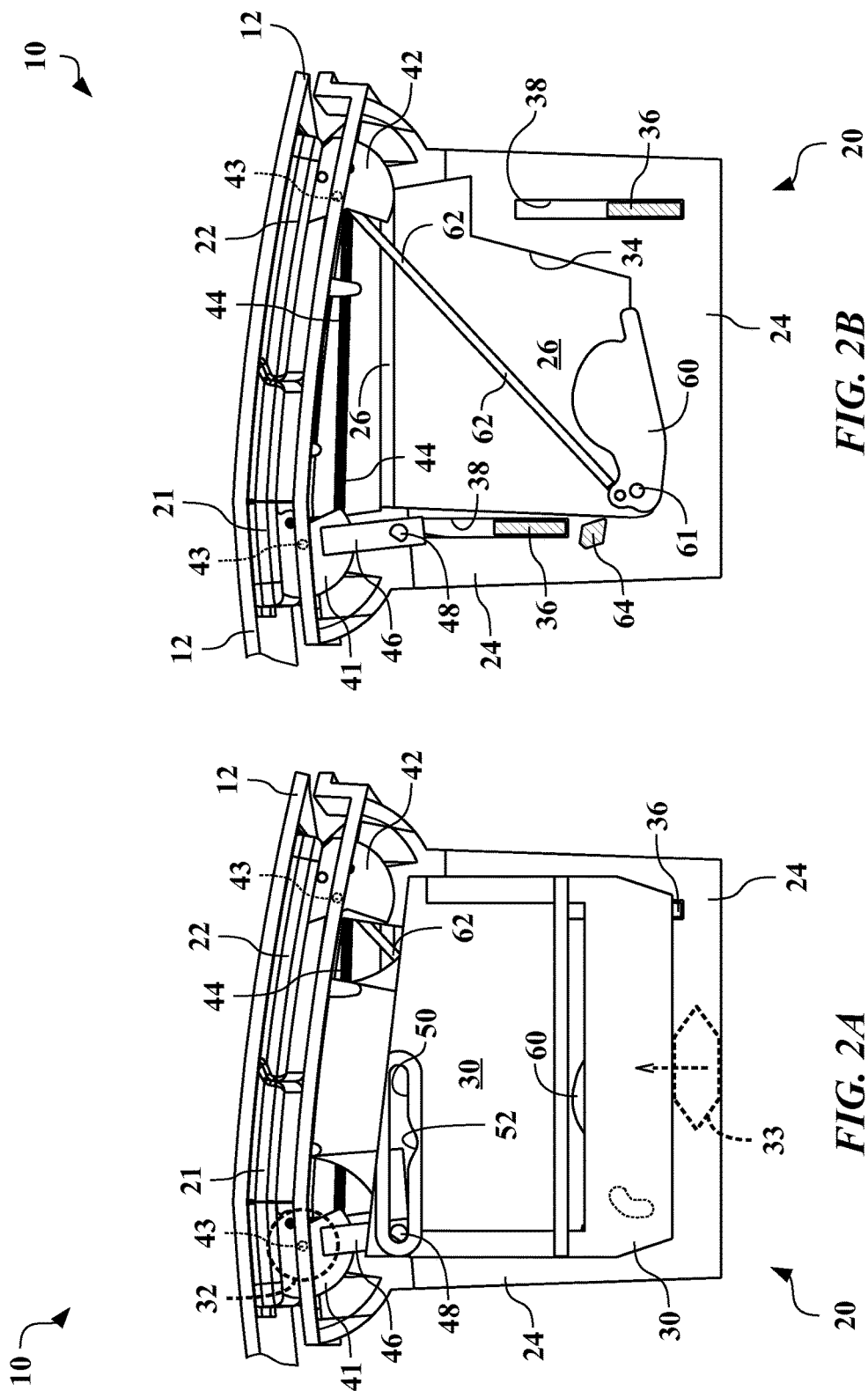

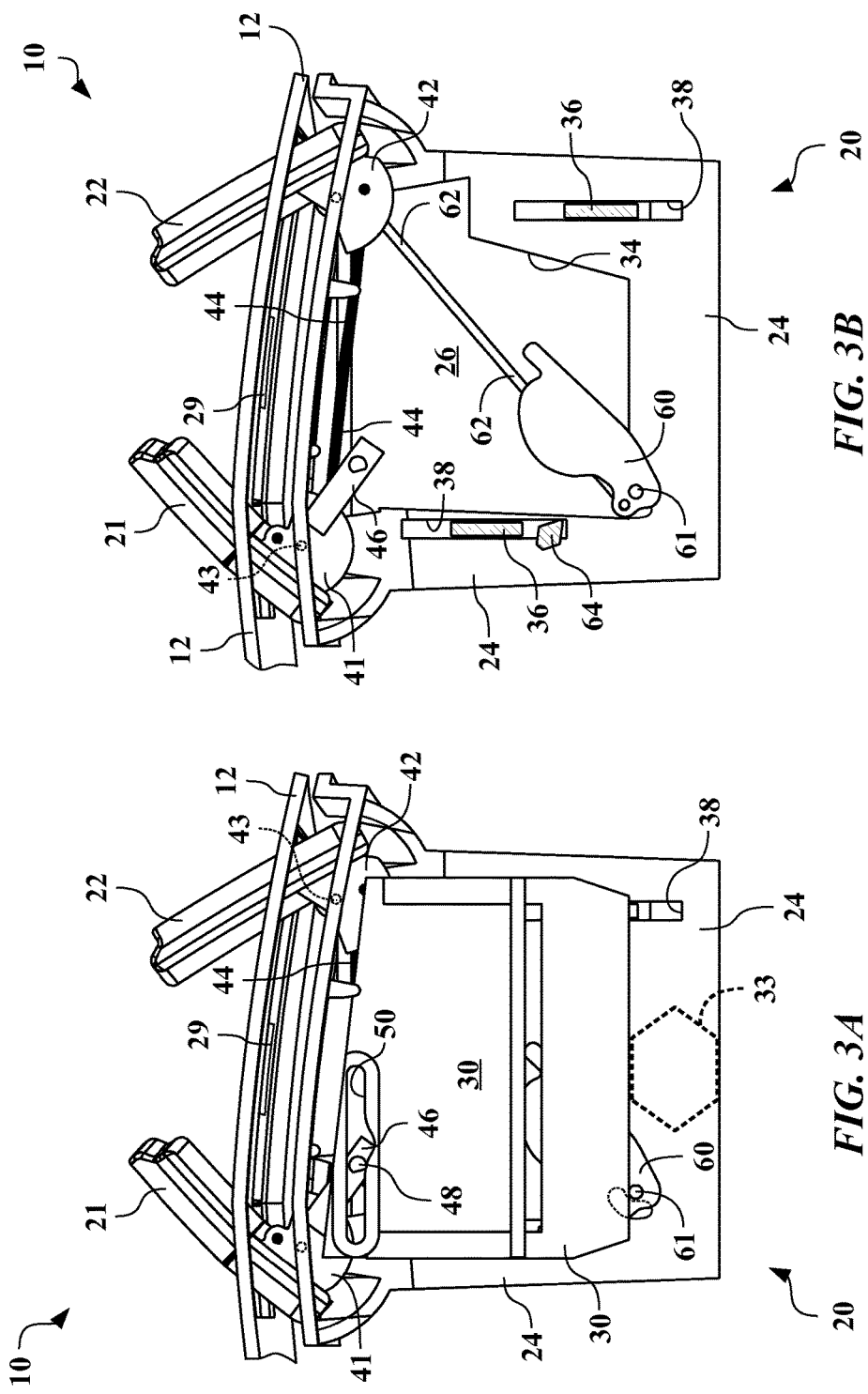

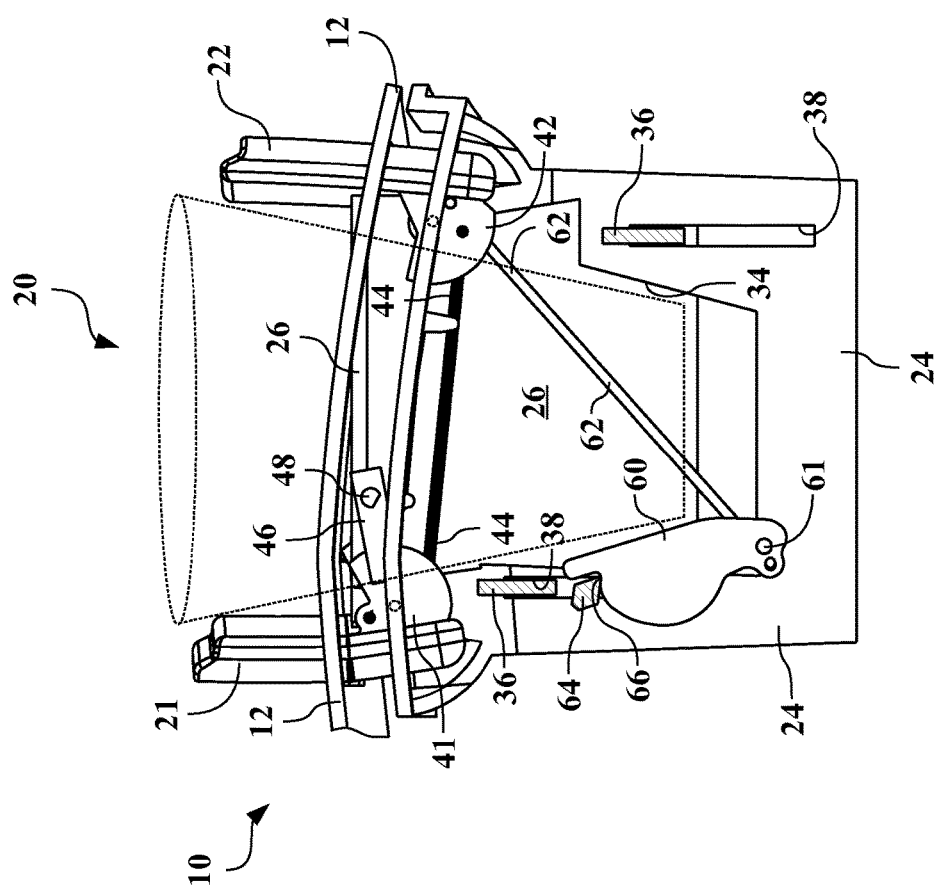

EMERGING BAY DOOR CUPHOLDER

TECHNICAL FIELD

This disclosure generally relates to closable or stowable cupholder structures.

BACKGROUND

Cupholders may be used to support and grasp liquid containers or other articles within reach of users located nearby.

SUMMARY

A cupholder assembly is provided. The cupholder assembly includes an outer housing and an inner carriage movably disposed within the outer housing. The inner carriage defines at least one cup well or cup volume into which containers or other articles may be placed.

A first door is movable between a closed position, which blocks the inner carriage, and an open position, which allows access to the inner carriage. Similarly, a second door is movable between a closed position, which blocks the inner carriage, and an open position, which allows access to the inner carriage.

A biasing member is configured to either: bias the inner carriage away from the outer housing, or rotate one of the first door and the second door. Opening one of the first door and the second door releases the biasing member, which causes at least a portion of the inner carriage to move upward relative to the outer housing, opening the cupholder.

The above features and advantages, and other features and advantages, of the present subject matter are readily apparent from the following detailed description of some of the best modes and other embodiments for carrying out the disclosed structures, methods, or both.

BRIEF DESCRIPTION OF THE DRAWINGS

FIG. 2A is a schematic, side view of the console assembly illustrated in FIG. 1, shown in a closed state.

FIG. 2B is a schematic, partial cross-sectional view of the console assembly illustrated in FIG. 2A, shown with a portion of the cupholder assembly cross-sectioned along a line 2-2 of FIG. 1 and with a portion cutout or removed to illustrate.

FIG. 3A is a schematic, side view of the console assembly, similar to the view of FIG. 2A but illustrated with the cupholder in a partially-open state.

FIG. 3B is a schematic, partial cross-sectional view of the console assembly, similar to the view of FIG. 2B but illustrated with the cupholder in a partially-open state.

FIG. 4C is a schematic, partial cross-sectional view of the console assembly, similar to the view of FIG. 4B but illustrated with the cupholder loaded and locked.

DETAILED DESCRIPTION

Figure 1:
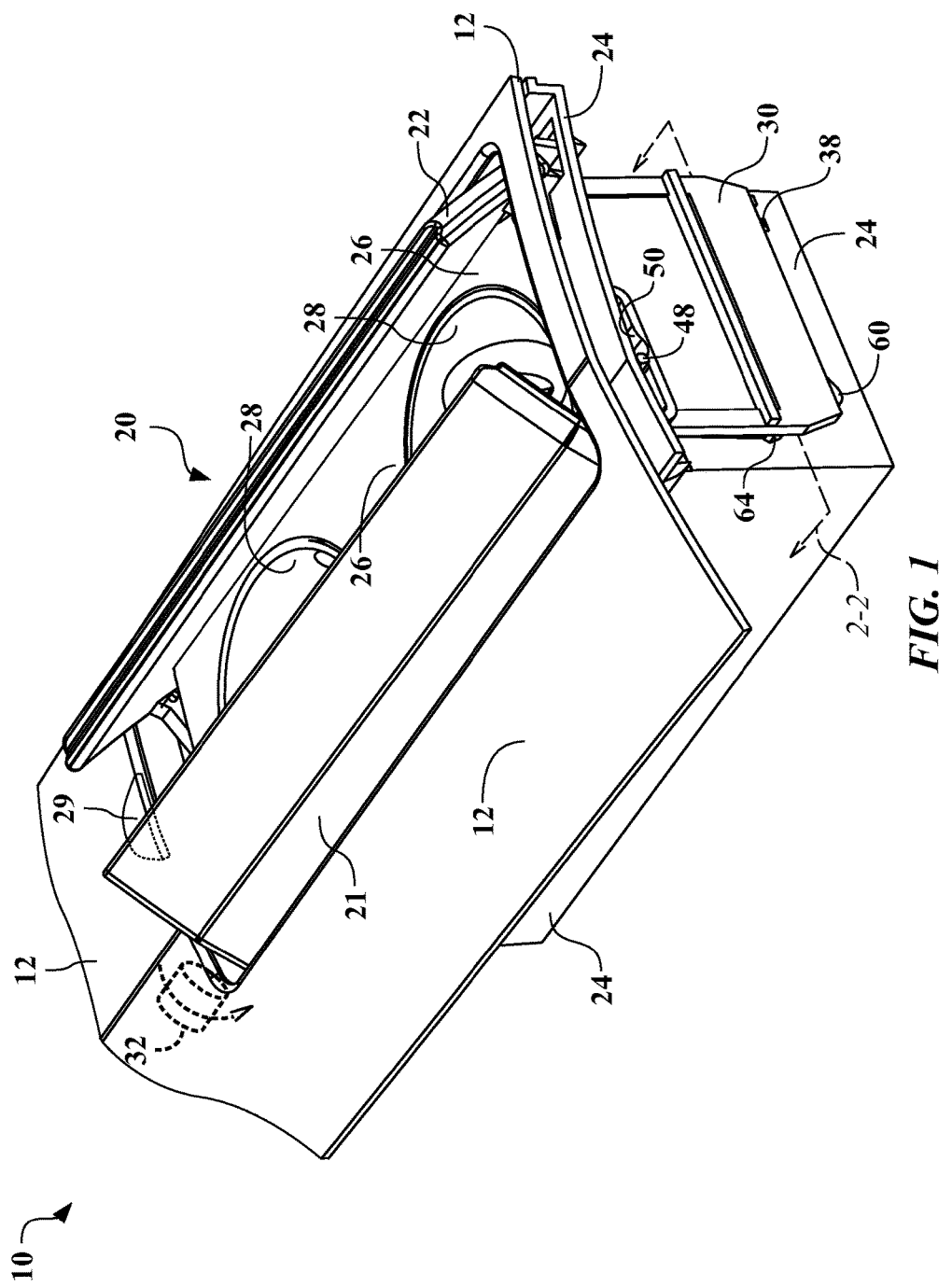
FIG. 1 is a schematic, isometric view of a portion of a console assembly, such as for a vehicle, having a retractable cupholder assembly.

Referring to the drawings, wherein like reference numbers correspond to like or similar components whenever possible throughout the several figures, there is shown in FIG. 1 a console assembly or console 10. The console 10 includes a cover plate 12 surrounding a cupholder assembly or cupholder 20, which is retractable or stowable within the console 10.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

In FIG. 1, the cupholder 20 is shown in a partially open position. The cupholder 20 includes a first door 21 movable between a closed position, which blocks the cupholder 20, and an open position, which allows access to the cupholder 20. Similarly, a second door 22 is movable between a closed position, which blocks the cupholder 20, and an open position, which allows access to the cupholder 20.

The first door 21 and the second door 22 collectively form a swinging-bay-style closure mechanism for the cupholder 20. An outer housing 24 sits below (as mounted in the surrounding console 10) the cover plate 12. An inner carriage 26 is movably disposed within the outer housing 24. In the configuration of the cupholder 20 shown in the figures, the inner carriage 26 reciprocates substantially vertically within the outer housing 24.

The inner carriage 26 defines at least one cup well 28. In the configuration of the cupholder 20 shown in FIG. 1, there are two cup wells 28, which are partially closed volumes into which cups, mugs, bottles, or other articles may selectively be placed. In general, the shape, size, and rigidity of the cup wells 28 is configured to keep articles substantially immobile, particularly those filled with liquids, during typical movement of the console 10. For example, during normal driving conditions when the console 10 is in a vehicle or substantially upright when the console 10 is mounted within furniture, such as a couch or recliner.

A latch 29 selectively locks the first door 21 and the second door 22 to the cover plate 12. As discussed herein, restraining the first door 21 and the second door 22 also restrains movement of the whole cupholder 20 relative to the cover plate 12 and the console 10. The latch 29 may be numerous configurations of releasable, mechanical devices to selectively restrain the first door 21 and the second door 22 when they are fully closed and abutting the cover plate 12.

A carriage plate 30 is fixedly attached to the inner carriage 26. In the configuration shown, the carriage plate 30 extends outside of the outer housing 24. However, in other configurations, the carriage plate 30 may be within the interior of the outer housing 24. Furthermore, the components or features of the carriage plate 30 may alternatively be formed on the main body of the inner carriage 26.

As shown in FIG. 1, the first door 21 and the second door 22 selectively block the inner carriage 26. Additionally, the first door 21 and the second door 22 allow the inner carriage 26 to rise from within the outer housing 24.

Referring also to FIGS. 2A-4C, and with continued reference to FIG. 1, there are shown additional views of the console 10 and the cupholder 20 in various states of operation. FIG. 2A shows an end view with the cupholder 20 and FIG. 2B shows a partial cross-sectional view of the console 10 with a portion of the cupholder 20 cross-sectioned along a line 2-2 of FIG. 1 and with a portion of the outer housing 24 cutout or removed to illustrate components of the cupholder 20. FIGS. 2A and 2B show the cupholder 20 in a substantially closed state, with the first door 21 and the second door 22 at approximately zero degrees of rotation.

Figure 4B:
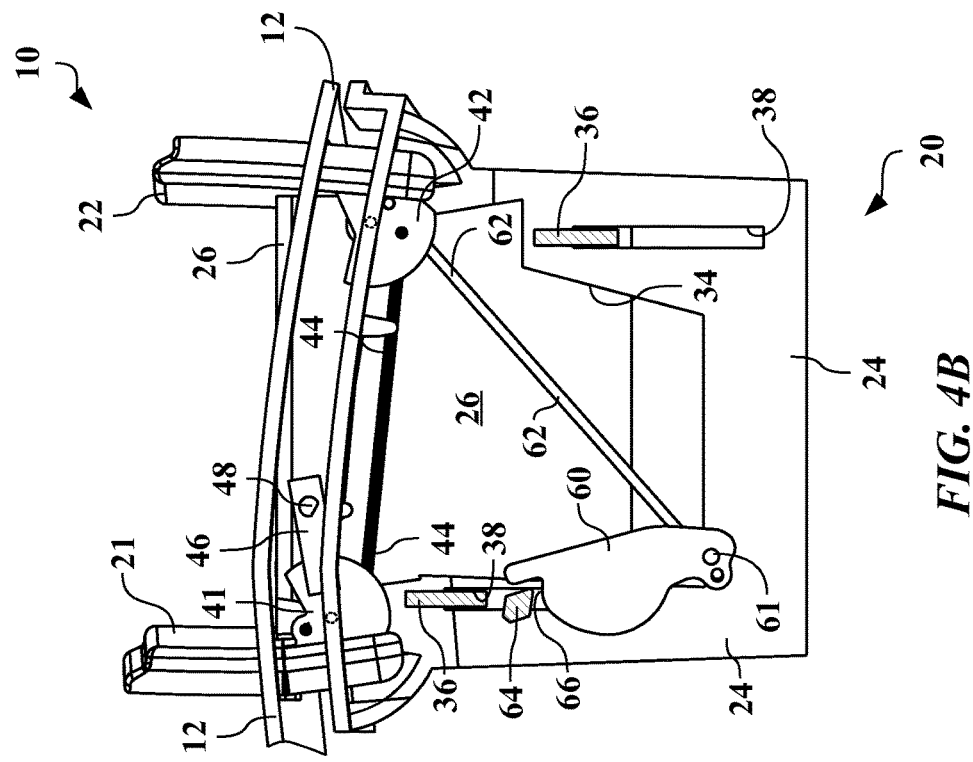
FIG. 4B is a schematic, partial cross-sectional view of the console assembly, similar to the view of FIGS. 2B and 3B but illustrated with the cupholder in an open state.
Figure 4A:
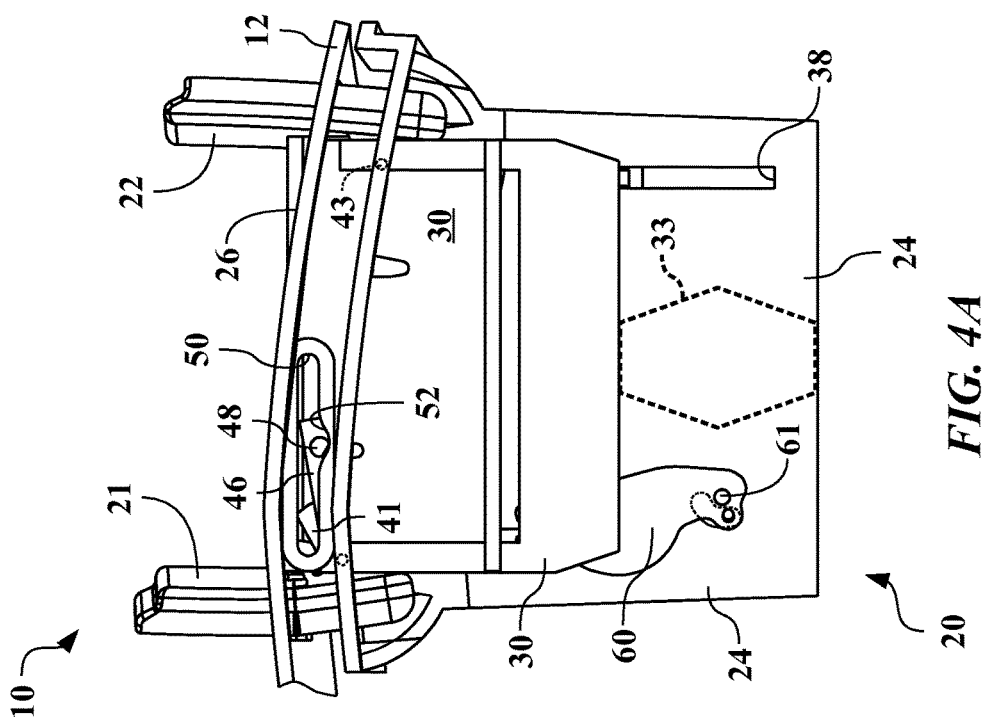
FIG. 4A is a schematic, side view of the console assembly, similar to the view of FIGS. 2A and 3A but illustrated with the cupholder in an open state.

FIG. 3A shows an end view and FIG. 3B shows a partially sectioned and cutout view of the cupholder 20 in a partially open state, with the first door 21 and the second door 22 at approximately forty-five degrees of rotation. Similarly, FIG. 4A shows an end view and FIG. 4B shows a partially sectioned and cutout view of the cupholder 20 in an open state, with the first door 21 and the second door 22 at approximately ninety degrees of rotation. FIG. 4C shows the same viewpoint as FIG. 4B, but with a cup inserted into one of the cup wells 28 of the cupholder 20. The cup weighs down and, as explained herein, locks or restrains downward movement of the cupholder 20, such that the cupholder 20 is unable to be closed while loaded.

In FIGS. 2B, 3B, 4B, and 4C, the inner carriage 26 is cross sectioned, generally along a line 2-2 illustrated in FIG. 1. Furthermore, a portion of the outer housing 24 is removed along a cutout section 34. By removing portions of the outer housing 24 and the inner carriage 26, several other components, and the interconnections there between, are illustrated in FIGS. 2B, 3B, 4B, and 4C.

At least one biasing member is configured to either bias the inner carriage 26 away (upward) from the outer housing 24 or to rotate one of the first door 21 and the second door 22. FIGS. 1 and 2A illustrate a rotational biasing member 32 that applies counterclockwise torque the first door 21. FIGS. 2A, 3A, and 4A also illustrate a linear biasing member 33 that applies an upward force to the inner carriage 26. The cupholder 20 may have only one of the rotational biasing member 32 and the linear biasing member 33, they may be used in concert, or other biasing members may be used.

Opening or releasing one of the first door 21 and the second door 22 releases the rotational biasing member 32 or the linear biasing member 33, which causes at least a portion of the inner carriage 26 to extend from, or move upward relative to, the outer housing 24. FIG. 1 shows a portion of the inner carriage 26 moved upward relative to the outer housing 24 and the cover plate 12, and FIGS. 3A-4C further illustrate such relative movement.

The biasing member may be, for example, and without limitation: a linear spring, a torsion or coil spring, a flexible bushing, or a counter weight (with gravity pulling the weight downward causing the inner carriage to rise). For example, the rotational biasing member 32 may be a torsion or coil spring attached to the pivot point or hinge of either the first door 21 or the second door 22, such that the rotational biasing member 32 applies torque tending to rotate the first door 21 or the second door 22 open.

As explained herein, movement of the first door 21 and the second door 22 is tied or linked to movement of the inner carriage 26 and, therefore, presentation of the cup wells 28. Releasing the first door 21 and the second door 22 allows the rotational biasing member 32, indirectly through the first door 21 or the second door 22, or the linear biasing member 33, directly, to act on the inner carriage 26. Therefore, opening the first door 21 and the second door 22 presents the cup wells 28 to the user.

The first door 21 and the second door 22 are mounted or attached at the edges of the outer housing 24, which prevents or minimizes objects from falling into the area between the inner carriage 26 and the outer housing 24. The wide-set first door 21 and the second door 22 and the linked movement of the first door 21 and the second door 22 and the inner carriage make the cupholder assembly 20 useful as part of, or in concert with, vehicular seating, or residential or commercial furniture, such as theater-style seating.

In the configuration shown in the figures, a plurality of guide posts 36 extend from the inner carriage 26 and slide vertically within a corresponding set of guide slots 38 formed in the outer housing 24. The guide posts 36 cooperate with the guide slots 38 to provide consistent, single-axis (vertical) movement of the inner carriage 26 within the outer housing 24. Note that other structures may be used to guide and promote consistent movement of the inner carriage 26 relative to the outer housing 24.

As shown in the figures, the cupholder 20 includes a first door cam 41 and a second door cam 42. The first door cam 41 pivotally attaches the first door 21 to the outer housing 24 at a pivot 43 and the second door cam 42 pivotally attaches the second door 22 to the outer housing 24 at another pivot 43. Therefore, the first door cam 41 and the second door cam 42 also act as hinges between the first door 21 and the second door 22, respectively, and the outer housing 24. In other configurations, the first door 21 and the second door 22 may be directly hinged to the outer housing 24, without intervening cam structures.

A door linkage 44 connects the first door cam 41 and the second door cam 42. The door linkage 44 ties rotation of the first door 21 and the second door 22, such that rotating one of the first door 21 and the second door 22 also rotates the other of the first door 21 and the second door 22. Therefore, as the rotational biasing member 32 causes one of the first door 21 and the second door 22 to rotate, the other door also rotates, and only one rotational biasing member 32 is required, even if it acts directly on only one door. In other configurations, the door linkage 44 may directly link the first door 21 to the second door 22, without the intervening cam structures, to cause common rotation of the first door 21 and the second door 22.

As shown in the figures the cupholder 20 includes a slider arm 46 extending from one of the first door cam 41 and the second door cam 42. In the configuration shown, the slider arm 46 extends from the first door cam 41, and movably or slidably interfaces with the inner carriage 26. The slider arm 46 links movement of the one of the first door cam 41 and the second door cam 42 to the inner carriage 26. Note that in configurations with the linear biasing member 33, the first door 21 and the second door 22 are linked to the linear biasing member 33 through the inner carriage 26.

The slider arm 46 has a slider pin 48 extending therefrom. The slider pin 48 sits within a control slot 50 defined in the inner carriage 26, wherein a portion of the slider arm 46, such as the slider pin 48, is disposed within the control slot 50, such that the control slot 50 defines the range of movement of the slider arm 46. A notch 52 is defined in the control slot 50 and allows some free movement (or slop) of the slider arm 46 relative to the guide slot 50. As described herein, the notch 52 allows the first door 21 and the second door 22 to rotate slightly without moving the inner carriage 26, which allows the inner carriage 26 to be freely recessed within the outer housing 24.

In the configuration shown, the control slot 50 is defined in the carriage plate 30 of the inner carriage 26, but may be formed elsewhere on the inner carriage 26. Note that in the figures, the carriage plate 30 is a separate component extending from the main body of the inner carriage 26. However, this configuration is optional, such that the features of the carriage plate 30 may be formed directly into the body of the inner carriage 26. The configuration shown may provide a benefit by separating and protecting some of the other components and linkages attached to the inner carriage 26 and the outer housing 24.

Comparison of FIGS. 2A and 2B to FIGS. 3A and 3B demonstrates movement of the cupholder 20 from closed to partially open, with the first door 21 and the second door 22 rotating approximately forty-five degrees there between. In FIGS. 2A and 2B, the latch 29, or a similar mechanical restraint, is locking first door 21 and the second door 22 to the cover plate 12. However, in FIGS. 3A and 3B, the latch 29 is actuated to release the first door 21 and the second door 22, freeing the rotational biasing mechanism 32 to rotate the first door 21 and the second door 22 or freeing the linear biasing member 33 to move the inner carriage 26 upward.

The control slot 50 and the slider arm 46 link or relate the movement of the inner carriage 26 to the first door 21 and the second door 22. In the configuration shown, this movement is translated through the first door cam 41, such that movement of the first door 21 rotates the first door cam 41, which translates to vertical movement of the inner carriage 26 through interaction of the slider pin 48 and the carriage slot 50.

Movement of the first door 21 and the second door 22 is related through the door linkage 44, which ties rotation of the first door cam 41 to the second door cam 42. Note that the door linkage 44 has an L-shape, with the short leg adjacent the first door cam 41, as best viewed in FIGS. 2A and 2B.

Similarly, comparison of FIGS. 3A and 3B to FIGS. 4A and 4B demonstrates movement of the cupholder 20 from partially open to substantially fully open, with the first door 21 and the second door 22 rotating approximately an additional forty-five degrees there between. Further movement of the first door 21 and the second door 22 may be prevented by the cover plate 12 or by stops or limits built into, for example and without limitation, the first door cam 41 and the second door cam 42. The guide posts 36 may also define both the upper and lower limits of movement of the inner carriage 26, which limits the rotational range of the first door 21 and the second door 22.

As shown in the figures, the cupholder 20 also includes a locking cam 60 pivotally attached to the outer housing 24 at a cam pivot 61. A locking linkage 62 connects one of the first door cam 41 and the second door cam 42 to the locking cam 60. In the configuration shown, the locking linkage 62 sits just inside of the outer housing 24 and ties movement of the second door cam 42 to the locking cam 60. A small half-moon shaped window is formed in the outer housing 24 to allow the locking linkage 62 to protrude through the outer housing 24 and connect to the locking cam 60.

A locking post or carriage lock 64 is defined on, or extends as a boss from, the inner carriage 26. In the configuration shown, the carriage lock 64 extends from the inner carriage 26, through the outer housing 24, to the carriage plate 30. The carriage lock 64 selectively interfaces with a locking surface 66 on the locking cam 60 to prevent the locking cam 60 from rotating, which, through the locking linkage 62, prevents the second door cam 42 and the first door cam 41 from moving.

Interaction between the locking cam 60 and the carriage lock 64 is illustrated by comparison between FIGS. 4B and 4C. In FIG. 4B, the cupholder 20 is fully open but no cups are within the cup wells 28 of the inner carriage 26, such that the cupholder 20 is unloaded. In FIG. 4C, one or more cups are placed into the cup wells 28, such that the cupholder 20 is loaded. The weight of the cups loads the inner carriage 26 and moves it downward within the outer housing 24.

As the inner carriage 26 moves downward, the attached carriage lock 64 also moves down, as shown in FIG. 4C. The carriage lock 64 comes into contact with the locking surface 66 of the locking cam 60. When the inner carriage 26 is loaded, the locking cam 60 is prevented from rotating (clockwise, in the configuration shown in the figures) about the cam pivot 61. The locking linkage 62 is also prevented from movement, which freezes or holds the second door cam 42. Therefore, while the carriage lock 64 engages the locking cam 60, the inner carriage 26 is prevented from movement downward through guide slots 38 as the carriage lock 64 contacts, and is impeded by, the locking cam 60, which moves into position under the carriage lock 64.

In the loaded position, as shown in FIG. 4C, major transient downward forces on the inner carriage 26 may be accommodated directly through load transfer from the carriage lock 64 boss to the locking cam 60, to the cam pivot 61 and then into the outer housing 24. Limits to such forces are substantially equal to the force needed to shear the carriage lock 64 boss feature or the cam pivot 61 of the locking cam 60. When the locking cam 60 is loaded in compression, the cupholder 20 may be able support heavy cups and occasional user elbow or knee loads to the inner carriage 26.

The downward force applied by the carriage lock 64 on the locking cam 60 also creates a moment of torque about the cam pivot 61 as the carriage lock 64 contacts the locking surface 66. The rotational force on the locking cam 60 (counterclockwise, in the configuration shown in FIG. 4C) draws the "V"-shaped notch in locking cam 60 toward the carriage lock 64 boss feature and acts to catch and nestle the carriage lock 64 boss feature stably along the locking surface 66. The larger the downward loading applied to the inner carriage 26, the more securely the carriage lock 64 boss feature is embraced by the locking surface 66.

The immobilized inner carriage 26, in turn, limits rotational movement of the first door 21; directly by the slider pin 48 in control slot 50, as well as indirectly by door linkage 44 and locking linkage 62. The overall effect is to shunt any large downward forces on the inner carriage 26 through compression loading of the locking cam 60 rather than putting high stress into the door linkage 44 and the locking linkage 62.

As shown in the figures, movement of each of the components of the cupholder 20 is interrelated to the remaining components. The locking cam 60 connects the first door 21 and the second door 22 to the outer housing 24. The carriage lock 64 prevents the locking cam 60 and, therefore, the first door 21 and the second door 22 from moving when locked by the carriage lock 64 of inner carriage 26.

As discussed herein, the control slot 50 and the slider arm 46 connect or relate the movement of the inner carriage 26 and the doors. The notch 52 in the control slot 50 allows some vertical freedom of movement of the slider pin 48 within the control slot 50. Therefore, the control slot 50 allows downward movement of the inner carriage 26 without rotating the first door 21 and the second door 22 closed (clockwise, as viewed in the figures), such that loading the inner carriage 26 does not also close the cupholder 20.

The vertical freedom of movement of the slider pin 48 within the control slot 50 allows the inner carriage 26 to move downward when loaded, until the carriage lock 64 engages with the locking cam 60. However, when the inner carriage is unloaded, as illustrated in FIGS. 4A and 4B, closing rotation of either of the first door 21 and the second door 22 rotates the locking cam 60 (clockwise, as viewed in the figures) away from the carriage lock 64 before it makes contact with the locking surface 66, which would prevent the cupholder 20 from retracting into the console 10.

In an alternative configuration, movement of the components of the cupholder 20 may be linked or tied via gears instead of linkages. For example, the first door cam 41 may have gear teeth that interface with linear teeth formed on the inner carriage 26, such that rotation of the first door 21 imparts linear motion to the inner carriage 26. Similar gearing may link the inner carriage 26 to the second door cam 42 or link the first door cam 41 to the second door cam 42.

The detailed description and the drawings or figures are supportive and descriptive of the subject matter discussed herein. While some of the best modes and other embodiments have been described in detail, various alternative designs, configurations, and embodiments exist.

The invention claimed is:

1. A cupholder assembly, comprising:
   an outer housing;
   an inner carriage movably disposed within the outer housing and defining at least one cup well;
   a first door movable between a closed position, which blocks the inner carriage, and an open position, which allows access to the inner carriage;
   a second door movable between a closed position, which blocks the inner carriage, and an open position, which allows access to the inner carriage;
   a biasing member configured to one of:
      bias the inner carriage away from the outer housing, and
      rotate one of the first door and the second door,
   wherein opening one of the first door and the second door releases the biasing member, causing at least a portion of the inner carriage to extend upward relative to the outer housing;
   a first door cam, wherein the first door cam pivotally attaches the first door to the outer housing;
   a second door cam, wherein the second door cam pivotally attaches the second door to the outer housing;
   a door linkage connecting the first door cam and the second door cam, such that rotating one of the first door and the second door also rotates the other of the first door and the second door;
   a locking cam pivotally attached to the outer housing;
   a locking linkage connecting one of the first door cam and the second door cam to the locking cam; and
   a carriage lock defined on the inner carriage, wherein the carriage lock selectively interfaces with the locking cam to prevent the locking cam from rotating, such that the locking linkage prevents one of the first door cam and the second door cam from moving.

2. The cupholder assembly of claim 1, further comprising:
   a slider arm extending from one of the first door cam and the second door cam and movably interfacing with the inner carriage, wherein the slider arm links movement of the one of the first door cam and the second door cam to the inner carriage.

3. The cupholder assembly of claim 2, further comprising:
   a control slot defined in the inner carriage, wherein a portion of the slider arm is within the control slot, such that the control slot defines the range of movement of the slider arm.

4. The cupholder assembly of claim 1, further comprising:
   a slider arm extending from one of the first door cam and the second door cam and movably interfacing with the inner carriage, wherein the slider arm links movement of the one of the first door cam and the second door cam to the inner carriage.

5. The cupholder assembly of claim 4, further comprising:
   a control slot defined in the inner carriage, wherein a portion of the slider arm is within the control slot, such that the control slot defines the range of movement of the slider arm.

6. The cupholder assembly of claim 5, further comprising:
   a cover plate surrounding the outer housing, wherein the cover plate is substantially aligned with the first door in the closed position and with the second door in the closed position.

7. A cupholder assembly, comprising:
   an outer housing;
   an inner carriage movably disposed within the outer housing and defining at least one cup well;
   a first door movable between a closed position, which blocks the inner carriage, and an open position, which allows access to the inner carriage;
   a second door movable between a closed position, which blocks the inner carriage, and an open position, which allows access to the inner carriage;
   a door linkage connecting the first door and the second door, such that rotating one of the first door and the second door also rotates the other of the first door and the second door;
   a biasing member configured to one of:
      bias the inner carriage away from the outer housing, and
      rotate one of the first door and the second door,
   wherein opening one of the first door and the second door releases the biasing member, causing at least a portion of the inner carriage to move upward within the outer housing;
   a slider arm extending from one of a first door cam and a second door cam and movably interfacing with the inner carriage, wherein the slider arm links movement of the one of the first door and the second door to the inner carriage; and
   a control slot defined in the inner carriage, wherein a portion of the slider arm is within the control slot, such that the control slot defines the range of movement of the slider arm.

8. The cupholder assembly of claim 7, further comprising:
   a locking cam pivotally attached to the outer housing;
   a locking linkage connecting one of the first door cam and the second door cam to the locking cam;
   a carriage lock defined on the inner carriage, wherein the carriage lock selectively interfaces with the locking cam to prevent the locking cam from rotating, such that the locking linkage prevents one of the first door cam and the second door cam from moving.

* * * * *